United States Patent
Yamashita

(10) Patent No.: US 7,283,445 B2
(45) Date of Patent: Oct. 16, 2007

(54) OPTICAL STORAGE DEVICE AND READING METHOD FOR OPTICAL STORAGE MEDIUM

(75) Inventor: Satoshi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 11/047,062

(22) Filed: Jan. 31, 2005

(65) Prior Publication Data

US 2005/0128925 A1 Jun. 16, 2005

Related U.S. Application Data

(63) Continuation of application No. PCT/JP2002/008775, filed on Aug. 30, 2002.

(51) Int. Cl.
*G11B 7/00* (2006.01)
(52) U.S. Cl. .................. 369/47.5; 369/116; 369/53.26; 369/47.52
(58) Field of Classification Search ...................... None
See application file for complete search history.

(56) References Cited

U.S. PATENT DOCUMENTS

| 5,550,800 | A | * | 8/1996 | Zucker | ...................... | 369/53.27 |
| 5,715,232 | A | * | 2/1998 | Chikazawa et al. | ...... | 369/275.2 |
| 6,922,383 | B2 | * | 7/2005 | Sakata et al. | ............ | 369/53.26 |

FOREIGN PATENT DOCUMENTS

| JP | 58-177534 | | 10/1983 |
| JP | 59-140647 | | 8/1984 |
| JP | 60-129954 | | 7/1985 |
| JP | 4-082038 | | 3/1992 |
| JP | 4-321938 | | 11/1992 |
| JP | 7-057264 | | 3/1995 |
| JP | 7-065375 | | 10/1995 |
| JP | 2001084627 | A * | 3/2001 |
| JP | 2001-351246 | | 12/2001 |

OTHER PUBLICATIONS

Chikazawa et al.; "One Method of Realization Relating to Concurrent ROM-RAM Optical Disk"; pp. 1319-1324; 1992 (full translation attached).

* cited by examiner

*Primary Examiner*—Andrea Wellington
*Assistant Examiner*—Jorge L Ortiz-Criado
(74) *Attorney, Agent, or Firm*—Greer, Burns & Crain, Ltd.

(57) ABSTRACT

A signal detection sections detect the light intensity modulated by the phase pits as ROM signals from the return lights of an optical storage medium that has phase pits and a recording layer to simultaneously regenerate data in the ROM and RAM, and detect the RAM signals where the return lights were modulated by the recording film. A feedback circuit reduces the cross-talk of the phase pits of the RAM signals of the recording film by feeding back the ROM signals to the laser drive current of the laser element, and a circuit for adjusting the feedback circuit so as to present a constant cross-talk suppression effect regardless the temperature change of the laser element. Since the feedback gain is changed by changing the laser temperature, an RF feedback gain, with which MO signals are not deteriorated by the change of the laser temperature, can be set.

14 Claims, 14 Drawing Sheets

FIG. 9

| FOCUSING ERROR SIGNAL FES | $\dfrac{(A+C)-(B+D)}{A+B+C+D}$ |
|---|---|
| TRACKING ERROR SIGNAL TES | $\dfrac{E-F}{E+F}$ |
| MO SIGNAL (RAM) | $G-H$ |
| LD POWER FEEDBACK SIGNAL (ROM1), (ROM2) | $G+H$ , $I$ |

FIG. 10

| | LD FEED BACK SIGNAL | ROM SIGNAL | RAM SIGNAL |
|---|---|---|---|
| ROM & RAM REPRODUCE SIMULTANEOUSLY | G+H | I | G−H |
| RAM RECORDING (MAGNETIC FIELD MODULATION RECORDING) | I | G+H | − |
| RAM RECORDING (LIGHT MODULATION RECORDING) | I | − | − |

FIG. 12
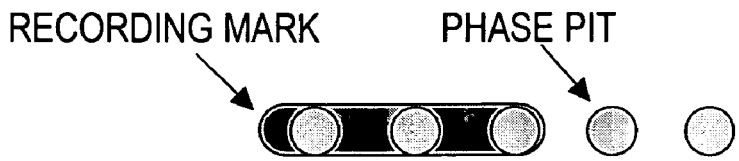
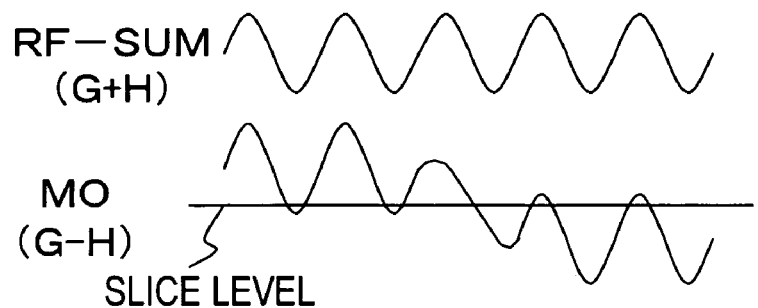
FIG. 13
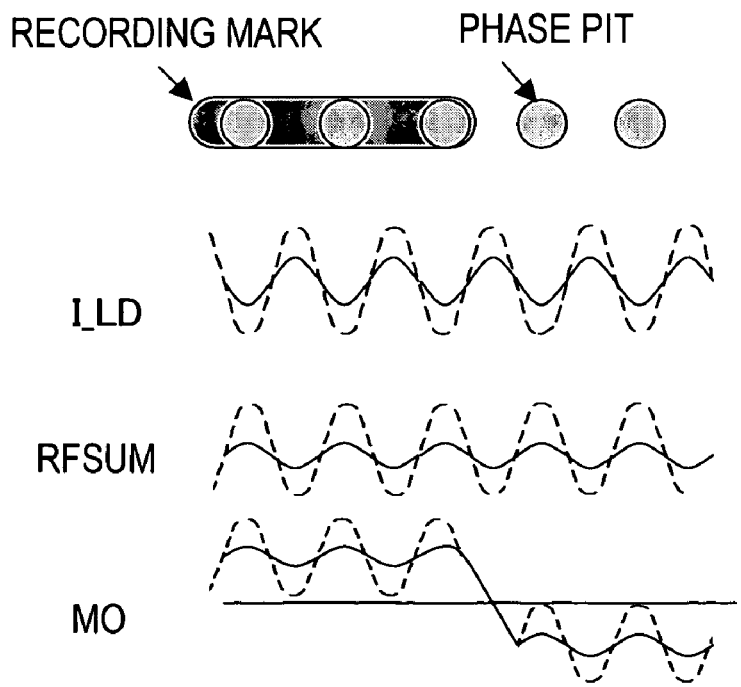

OPTICAL STORAGE DEVICE AND READING METHOD FOR OPTICAL STORAGE MEDIUM

CROSS-REFERENCE TO RELATED APPLICATIONS

This application is a continuation of international application PCT/JP2002/008775, filed on Aug. 30, 2002.

TECHNICAL FIELD

The present invention relates to an optical storage device and a reading method for an optical storage medium, where an optical head optically records and regenerates data to/from an optical recording medium, and more particularly to an optical storage device and a reading method for an optical storage medium that reads ROM (Read Only Memory) data and RAM (Random Access Memory) data using an optical recording medium that has both functions of ROM based on phase pits and RAM based on a recording layer.

BACKGROUND ART

Technology advancements in the information recording field is remarkable. And research and development on high-density recording/regeneration and high-speed access for optical memory using light, such as a magneto-optical disk memory, are aggressively on-going. Research and development to enhance such characteristics of an optical disk memory are progressing, and in Japanese Patent Application Laid-Open No. H6-202820, for example, a concurrent ROM (Read Only Memory)—RAM (Random Access Memory) optical disk (hereafter called optical information recording medium), where simultaneous regeneration of ROM and RAM is possible, is disclosed.

Such an optical information recording medium, where the simultaneous regeneration of ROM and RAM is possible, can provide a storage capacity that is double that of an ordinary optical disk memory, and simultaneous regeneration of ROM-RAM, which is impossible for a magnetic disk, is possible.

In the above mentioned prior art, for example, an optical information recording medium where phase pits are formed in spirals or concentrically on an optically transparent substrate, and a magneto-optical recording film is formed thereon, are used. And lights are condensed almost up to the diffraction limit from the optical pickup, and are irradiated onto the optical information recording medium. While the light intensity of the return lights from the optical information recording medium which are modulated by the phase pits, are regenerated as ROM signals, and the differential amplitude of the polarization direction components after modulating the return lights by the magneto-optical recording film are regenerated as RAM signals.

Also a magnetic head, for applying a magnetic field onto the optical information recording medium, is installed in the optical pickup, and RAM signals are recorded onto the magneto-optical recording film by changing at least one of the condensed light and the magnetic field from the optical pickup.

In such an optical information recording medium having ROM information and RAM information on a same recording face, many improvements exist to simultaneously regenerate the ROM information on the phase pits PP and RAM information on the magneto-optical recording OMM.

As an obstacle to stably regenerate the RAM information along with the ROM information, the light intensity modulation generated by reading the ROM information becomes a cause of noise when regenerating the RAM information. For this, the present applicant proposed in U.S. Pat. No. 7,154,836 that the light intensity modulation signals, which accompany the reading of ROM information, are negative-fed back to the laser for read driving.

By this method, the light intensity modulation noise can be decreased and the leak of the phase pit signals into the magneto-optical signals can be decreased. However the laser light emitting element heats up when a drive current is supplied, and the light emission power changes depending on the temperature, even if the drive current value to be supplied is the same. Therefore when the phase pit signals are suppressed by negative-feed backing the light modulation intensity signals to the laser light emitting element according to the above proposal, the suppression gain changes depending on the temperature change, which changes the phase bit crosstalk amount. As a result, the quality of the magneto-optical signals deteriorates, and this proposal alone is not sufficient in terms of the noise reduction effect.

DISCLOSURE OF THE INVENTION

With the foregoing in view, it is an object of the present invention to provide an optical storage device and a reading method for an optical storage medium for preventing the fluctuation of the phase pit signal suppression gain due to the change of the laser temperature and for preventing the quality deterioration of the RAM regeneration signals.

It is another object of the present invention to provide an optical storage device and a reading method for an optical storage medium for automatically adjusting the negative feedback gain of the phase pit signals so as to prevent the deterioration of the RAM regeneration signals due to the change of the laser temperature.

It is still another object of the present invention to provide an optical storage device and a reading method for an optical storage medium for automatically adjusting the negative feedback gain of the phase pit signals so as to prevent the deterioration of the RAM regeneration signals due to the change of laser temperature, using a simple structure.

In order to solve the above problems, the optical storage device of the present invention has an optical head for irradiating lights from a laser element onto a ROM-RAM optical recording medium where a recording film is formed on a substrate in which the phase pits are formed, and detecting the return lights from the optical recording medium, a signal detection section for detecting the light intensity modulated by the phase pits as ROM signals from the return lights and detecting the RAM signals where the return lights are modulated by the recording film, a reducing unit for feeding back the ROM signals to the laser drive current of the laser element to reduce the crosstalk of the phase pits of the RAM signals of the recording film, and an adjusting unit for adjusting the reduction unit so as to present a constant crosstalk suppression effect regardless the temperature change of the laser element.

According to the present invention, the feedback system for reducing the crosstalk of the phase pits is adjusted such that the quality of the MO signals does not deteriorate due to the change of the laser temperature, so the characteristics of the MO regeneration signals can be improved.

In the present invention, it is preferable that the adjusting unit further has a changing unit for changing the feedback gain of the phase pit signals according to the laser temperature of the laser element. Because of this, the RF feedback gain can be set such that the quality of the MO signals does not deteriorate due to the change of the laser temperature. Therefore the characteristics of the MO regeneration signals can be further improved.

Also in the present invention, it is preferable that the adjustment unit further has a changing unit for comparing the APC reference voltage to be applied and the drive voltage to perform APC control of the laser element and changing the feedback gain. Therefore, the phase pit feedback gain, according to the temperature of the laser element, can be easily set.

Also in the present invention, it is preferable that the adjustment unit further has a changing unit for performing A/D conversion of the drive voltage of the APC control of the laser element, and inputting the A/D conversion value into a main controller that computes the difference between the reference voltage and the drive voltage and changes the feedback gain. Therefore, the phase pit feedback gain, according to the temperature of the laser element, can be easily set.

Also in the present invention, it is preferable that the adjustment unit further has a temperature sensor for detecting the temperature of the laser element, and a changing unit for computing the difference between the detected temperature and the reference temperature, and changing the feedback gain. Therefore, the temperature of the laser element can be easily detected and the phase pit feedback gain can be set easily.

Also in the present invention, it is preferable that the recording laser of the ROM-RAM optical storage medium is composed of a magneto-optical recording layer, and the signal detection circuit detects the differential amplitude of the polarization component of the return lights as RAM signals, so that the present embodiment can be implemented using the optical storage medium with a simple configuration.

It is also preferable that the present invention further has APC control unit for detecting the emitting light of the laser element and controlling the optical output of the laser element to be constant, and the laser element is driven by adding the output of the reducing unit to the output of the APC control circuit, so that the phase pit crosstalk noise can be reduced stably.

It is also preferable that the present invention further has a feedback control switch for controlling whether the output of the reducing unit is applied to the APC control circuit, so that feedback ON/OFF can be easily controlled.

BRIEF DESCRIPTION OF THE DRAWINGS

FIG. 9 is a table showing the relationship of the output of the optical detector in FIG. 8, the focus error (FES) detection, the track error (TES) detection, the MO signal and the LD feedback signals based on the output;

FIG. 10 is a table showing the combination of the ROM and RAM detections in the regeneration and recording modes in the main controller in FIG. 5 and FIG. 7;

FIG. 12 is a diagram depicting the operation when the RF feedback is OFF;

FIG. 13 is a diagram depicting the operation when the RF feedback is ON;

PREFERRED EMBODIMENTS OF THE INVENTION

Embodiments of the present invention will now be described in the sequence of the ROM-RAM optical disk, optical disk drive, LD driver and other embodiments.

ROM-RAM Optical Disk

Figure 1:
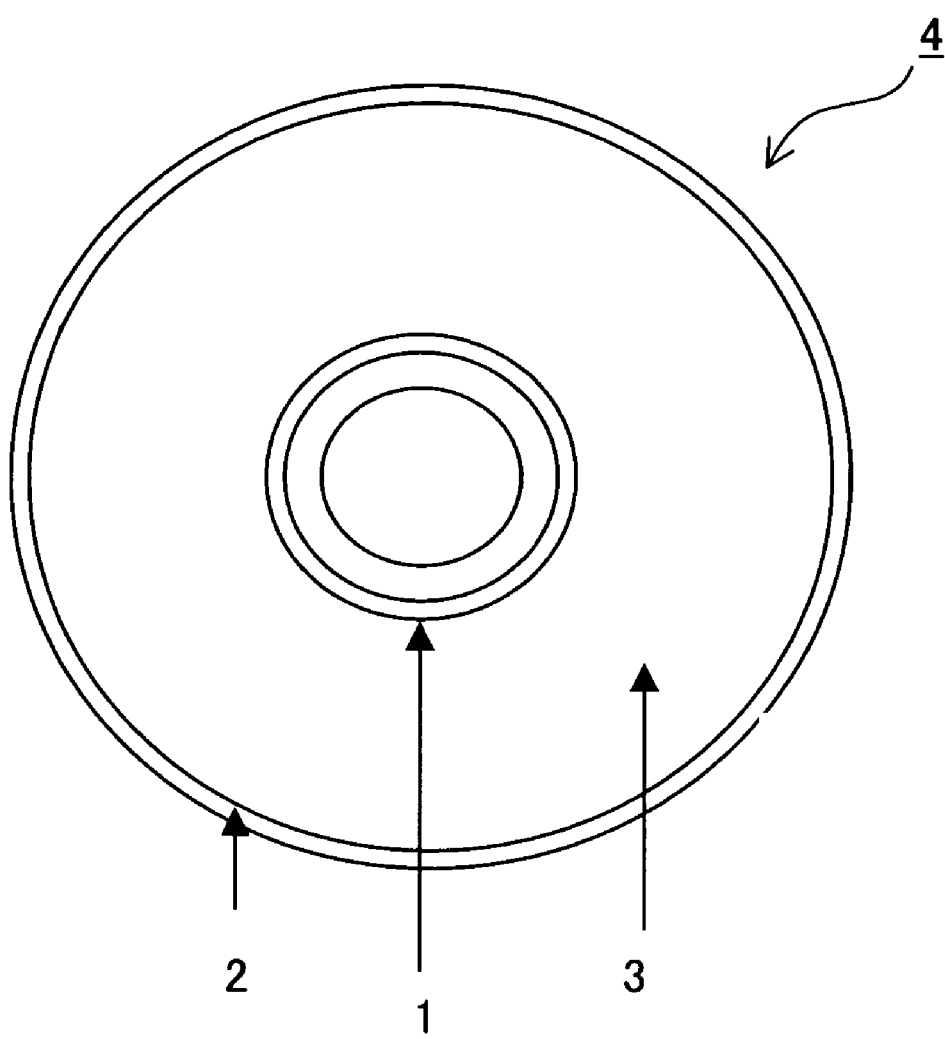
FIG. 1 is a plan view depicting a magneto-optical disk as an example of an optical information recording medium to be used for an embodiment of the present invention.
Figure 2:
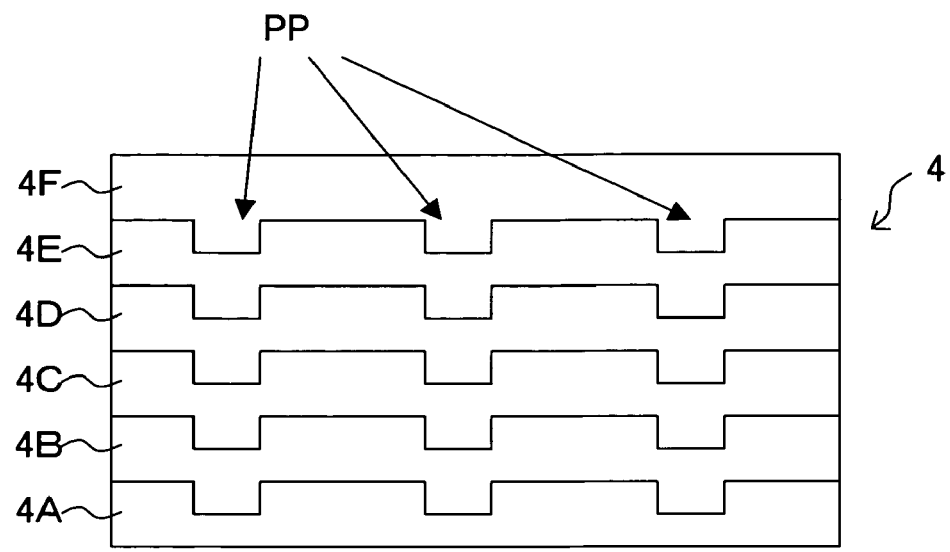
FIG. 2 is a cross-sectional view depicting the configuration of the ROM-RAM magneto-optical disk memory in FIG. 1.
Figure 3:
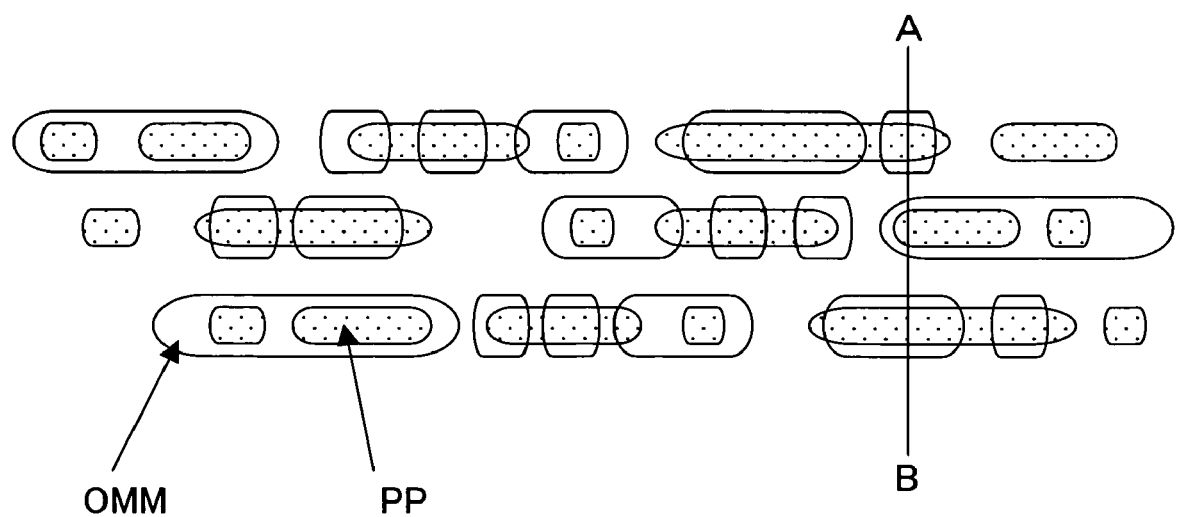
FIG. 3 is a plan view depicting the recording status of the ROM information and the RAM information in the optical information recording medium with the structure in FIG. 2.
Figure 4:
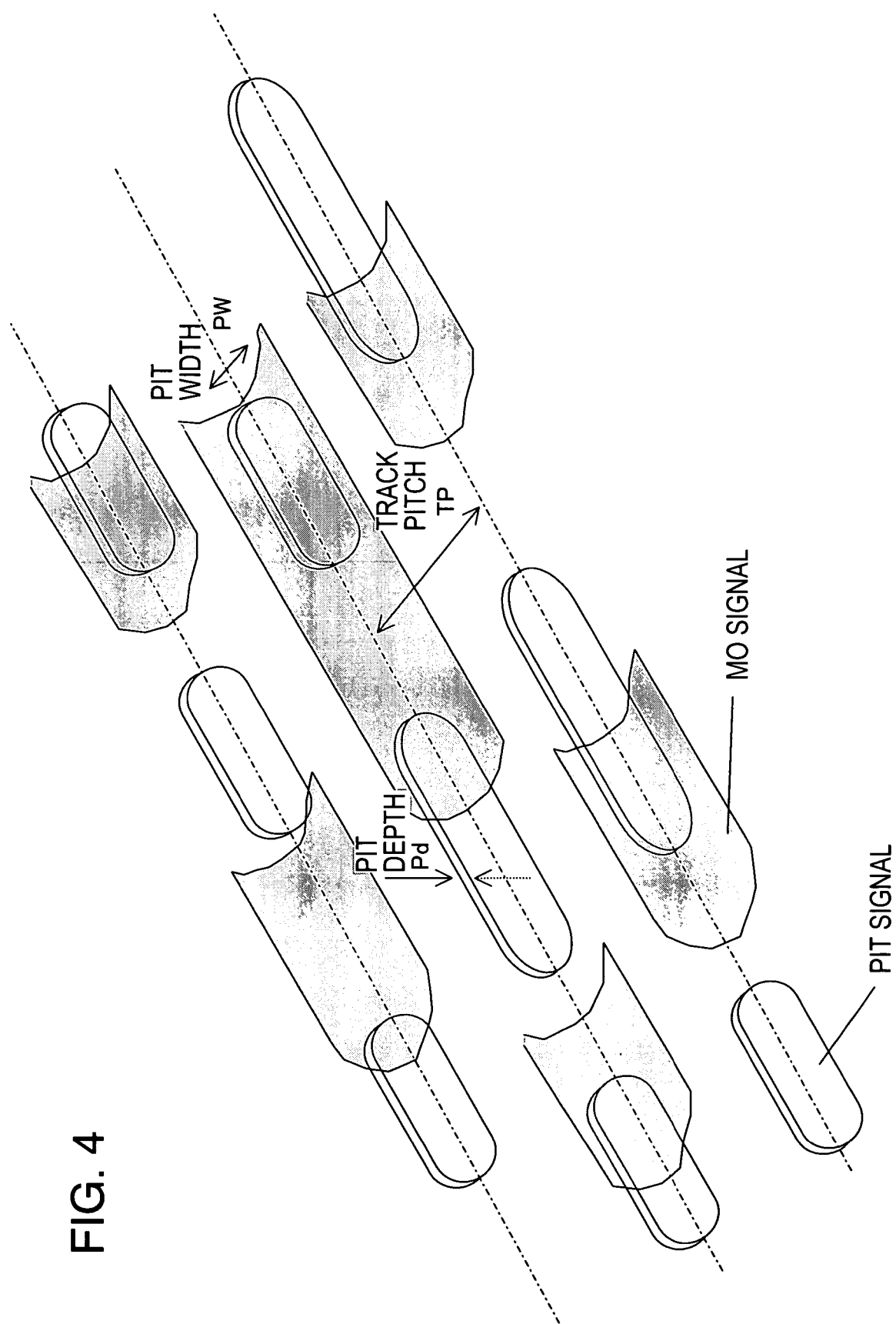
FIG. 4 is a perspective view depicting the recording status of the ROM information and the RAM information in the optical information recording medium with the structure in FIG. 2.

FIG. 1 is a plan view depicting a ROM-RAM optical recording medium according to an embodiment of the present invention, FIG. 2 is a cross-sectional view thereof, FIG. 3 is a front view of the user area thereof, and FIG. 4 is a diagram depicting the relationship between a ROM signal and a RAM signal thereof.

In the description in FIG. 1 or later, a ROM-RAM magneto-optical disk (MO) will be described as an example of a ROM-RAM optical recording medium. As FIG. 1 shows, the ISO standard magneto-optical disk 4 has a disk shape where the read-in area 1 is created in the innermost circle and the read-out area 2 is created in the outermost circle, and the user area 3 is created between.

The read-in area 1 and the read-out area 2 are ROM information areas comprised of phase pits, which are formed as bumps on a polycarbonate substrate, where such information as disk specifications is recorded. The conditions of recording/regeneration are controlled by reading this information. The optical depth of the phase pits (pit depth) as this ROM information is set such that the light intensity modulation during regeneration reaches the maximum. Generally the degree of modulation (ratio of the change of light intensity in the phase pit area with respect to the light intensity in the flat area) is set to 70% or more.

The user area 3, where the magneto-optical recording film is formed by a sputtering device, is created between the read-in area 1 and the read-out area 2. A user can freely record/regenerate information in this user area 3.

In order for the user area 3 to have ROM and RAM functions, the magneto-optical disk 4 generally is comprised of a first dielectric layer 4B made of such material as silicon nitride and tantalum oxide, a magneto-optical recording layer 4C made of an amorphous alloy of rare earth metals, such as TbFeCo, and a transition metal, a second dielectric layer 4D made of materials which are the same as those of the first dielectric layer 4B, a reflection layer 4E made of such metal as AlTi and Au, and a protective coat layer 4F made of ultraviolet hardening resin on a polycarbonate substrate 4A where phase pits are formed, as FIG. 2 shows.

As FIG. 2 and FIG. 3 show, the ROM function is provided by the phase pits PP formed by bumps on the disk 4, and the RAM function is provided by the magneto-optical recording layer 4C. To record data onto the magneto-optical recording layer 4C, a laser beam is irradiated onto the magneto-optical recording layer 4C to assist magnetization inversion, and magneto-optical signals OMM are recorded by inverting the direction of the magnetization corresponding to the signal magnetic field. By this, the RAM information can be recorded.

A weak laser beam is irradiated onto the recording layer 4C to read the recorded information on the magneto-optical recording layer 4C, which changes the plane of the polarization of the laser beam by the polar Kerr effect according to the magnetization direction of the recording layer 4C, and the presence of signals is judged by the weak or strong of the polarized light components in the reflected light at this time. By this, the RAM information can be read. In this reading, the reflected light is modulated by the phase pits PP constituting the ROM, so the ROM information can be read simultaneously.

In an optical information medium having such a structure, the ROM information is fixed-recorded by the phase pits PP which are bumps formed on a flat substrate, and the RAM information is recorded on the magneto-optical recording layer on the phase pit PP lines as MO signals OMM, as shown in FIG. 3 and FIG. 4. The cross-section in the A-B line in the radius direction in FIG. 3 matches FIG. 2.

In other words, ROM and RAM can be simultaneously regenerated by one optical pickup. When a magnetic field modulation type magneto-optical recording is used, the writing of RAM and the regeneration of ROM can be implemented simultaneously.

Optical Disk Drive

Figure 5:
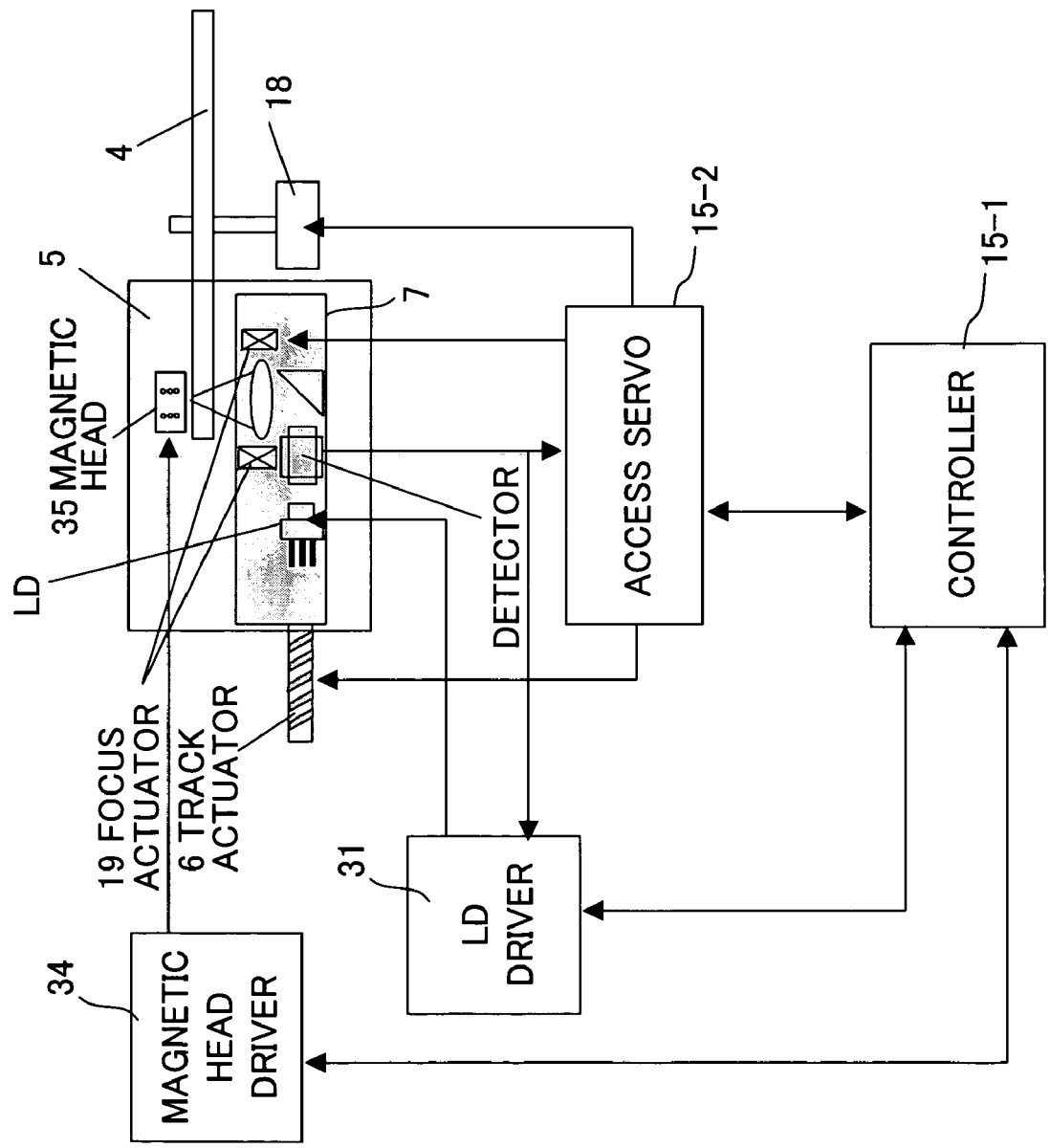
FIG. 5 is a block diagram depicting the entire configuration of an embodiment of the optical storage device of the present invention.
Figure 6:
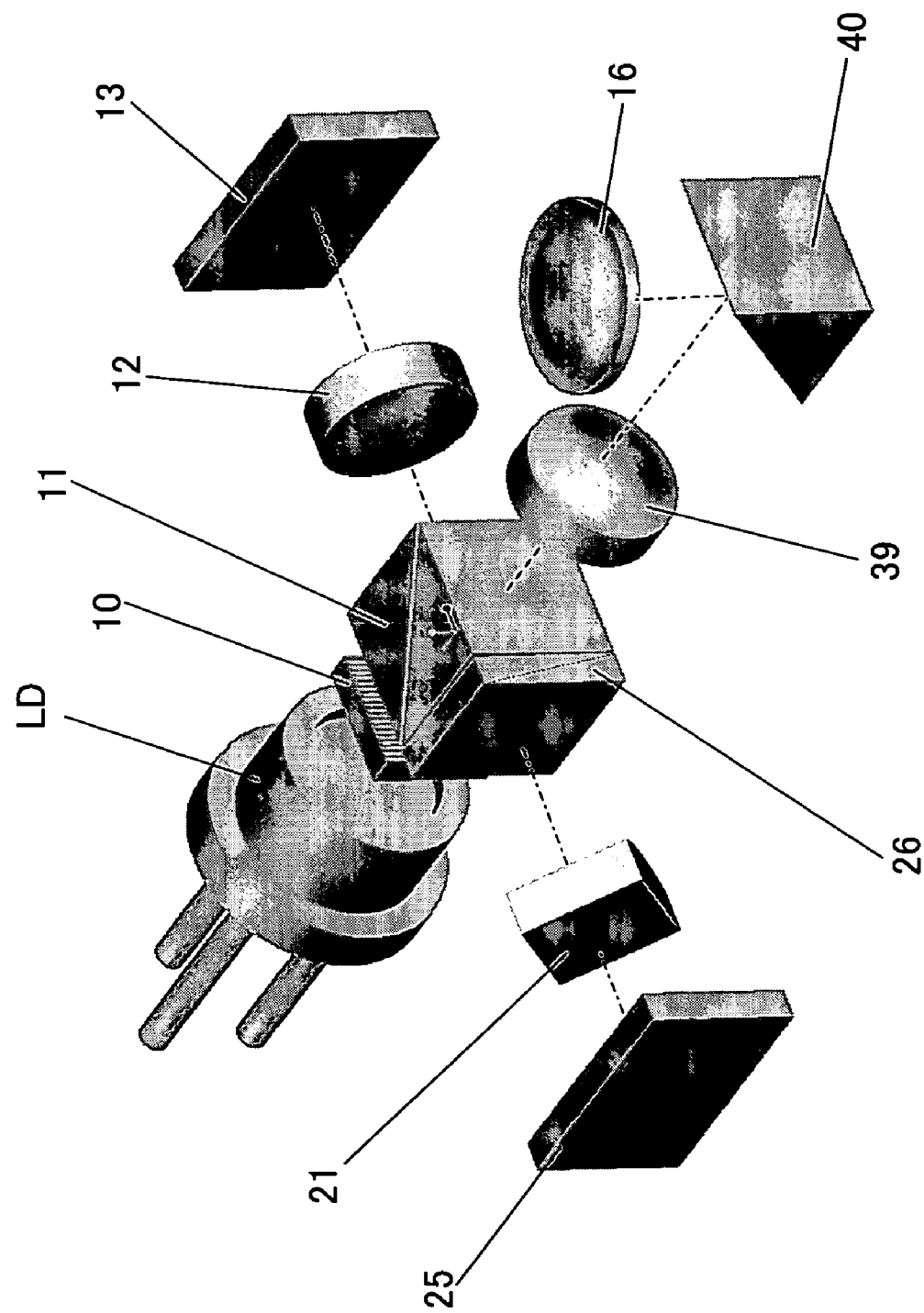
FIG. 6 is a diagram depicting the details of the optical system of the optical pickup in FIG. 5.
Figure 7:
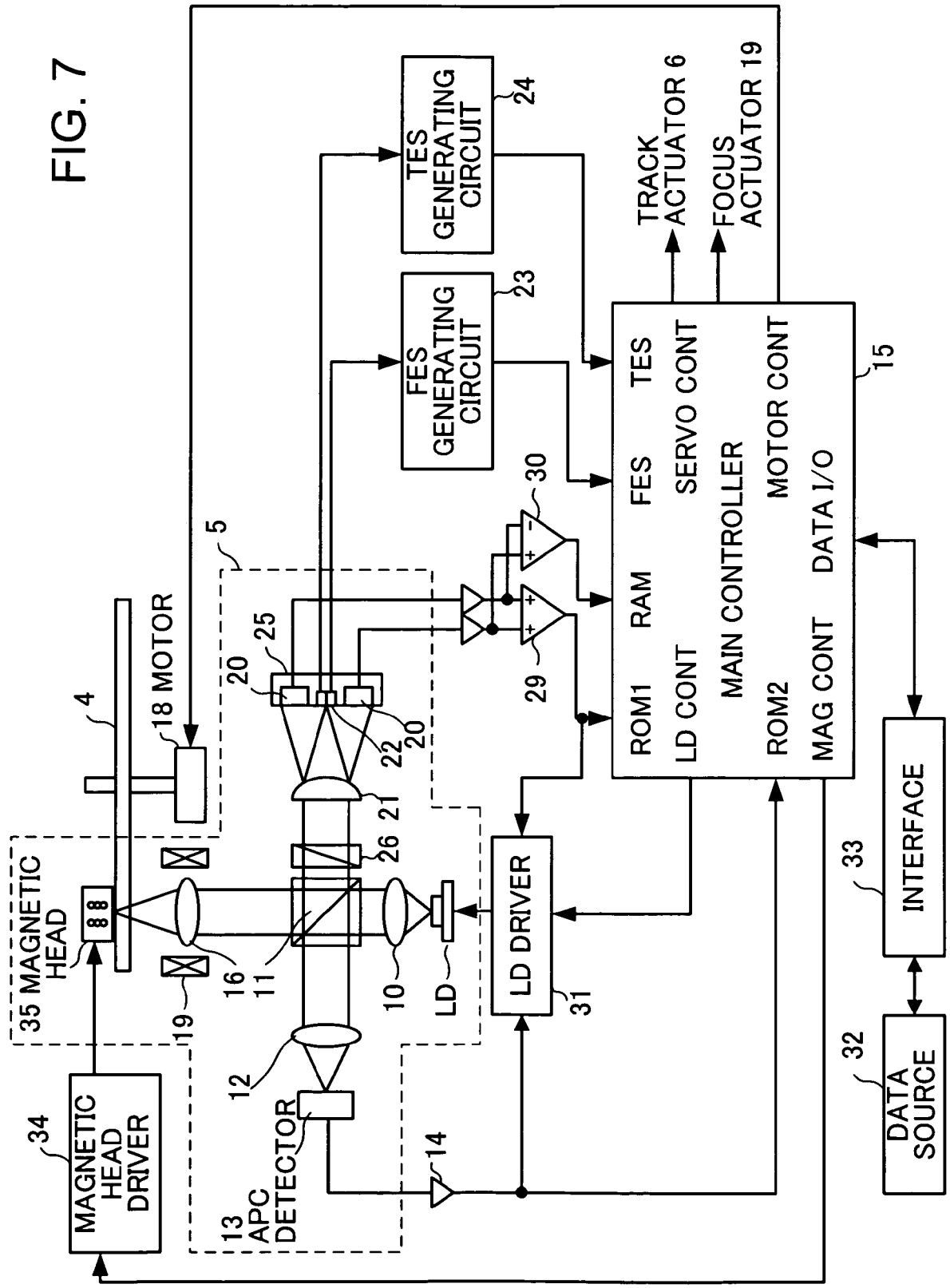
FIG. 7 is a detailed block diagram depicting a part of FIG. 5.
Figure 8:
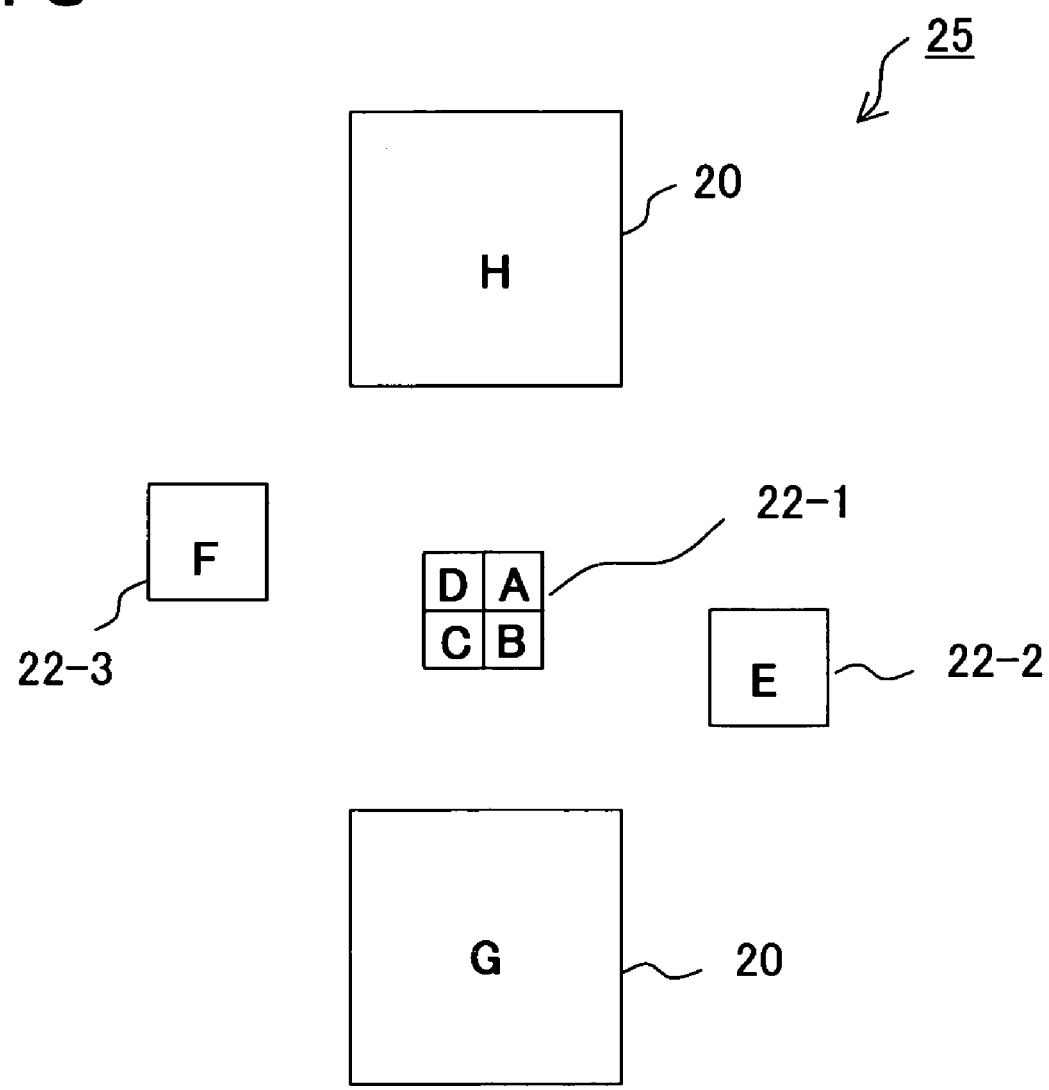
FIG. 8 is a diagram depicting the arrangement of the optical detectors in FIG. 6 and FIG. 7.

Now the optical disk device according to the present invention will be described. FIG. 5 is a block diagram depicting an entire optical disk drive according to an embodiment of the present invention, FIG. 6 is a diagram depicting the configuration of the optical system of the drive in FIG. 5, FIG. 7 is a block diagram depicting the signal processing system of the drive in FIG. 5, FIG. 8 is a diagram depicting the arrangement of the detectors in FIG. 6 and FIG. 7, FIG. 9 is a table showing the relationship between the output of the detector and the generation signals, and FIG. 10 is a table describing each mode of the optical disk drive.

As FIG. 5 shows, the spindle motor 18 rotates the optical information recording medium (MO disk) 4. Normally the MO disk 4 is a removable medium and is inserted through a slot of the drive, which is not illustrated. The optical pickup 5 has the magnetic head 35 and the optical head 7, which are disposed so as to sandwich the optical information recording medium 4.

The optical pickup 5 can be moved by the track actuator 6, such as a ball screw feed mechanism, so as to access an arbitrary position on the optical information recording medium 4 in the radius direction. The optical disk drive also has an LD (Laser Diode) driver 31 for driving the laser diode LD of the optical head 7, and the magnetic head driver 34 for driving the magnetic head 35 of the optical pickup 5. The servo controller for access 15-2 servo-controls the track actuator 6, motor 18 and the focus actuator 19 of the optical head 7 according to the output from the optical head 7. The controller 15-1 operates the LD driver 31, magnetic head driver 34 and servo controller for access 15-2, to record/regenerate information.

Details of the optical head 7 will be described with reference to FIG. 6. The diffused lights from the laser diode LD become parallel lights by the collimator lens 39 via the diffraction grating for three-beam tracking 10 and the beam splitter 11, and the parallel lights are reflected by the mirror 40 and condensed on the optical information recording medium 4 by the objective lens 16 almost up to the diffraction limit.

A part of the lights that enters the beam splitter 11 is reflected by the beam splitter 11 and is condensed to the APC (Auto Power Control) detector 13 via the condensing lens 12.

The lights reflected by the optical information recording medium 4 are reflected by the mirror 40 via the objective lens 16 again, become converging lights by the collimate lens 39, and enter the beam splitter 11 again. A part of the lights which reentered the beam splitter 11 returns to the laser diode LD side, and the rest of the lights are reflected by the beam splitter 11, and are condensed on the reflected light detector 25 via the three-beam Wollaston prism 26 and the cylindrical face lens 21.

Now the shape and the arrangement of the reflected light detector 25 will be described. Since three beams of light are entered, the reflected light detector 25 is constructed of the four-division detector 22-1, MO signal detectors 20 disposed at the top and bottom thereof, and the detectors for track error detection 22-2 and 22-3 which are disposed at the right and left thereof, as shown in FIG. 8.

The regeneration signals will now be described with reference to FIG. 7 and FIG. 9. As FIG. 7 shows, the FES (Focus Error Signal) regeneration circuit 23 detects a focus error (FES) by the astigmatism method shown in FIG. 9 by using the photo-electric converted outputs A, B, C and D of the four-division photo-detector 22. In other words, $$FES=\{(A+B)-(C+D)\}/(A+B+C+D) \text{ or}$$

$$FES=\{(A+C)-(B+D)\}/(A+B+C+D)$$

At this time, using the arithmetic expression in FIG. 9, the track error (TES) is detected from the outputs E and F of the detectors for track error detection 22-2 and 22-3 based on the push-pull method by the TES generation circuit 24.

$$TES=(E-F)/(E+F)$$

The focus error signals (FES) and the track error signals (TES) determined by these calculations are input to the main controller 15 (servo controller for access 15-2 in the case of FIG. 5) as the position error signals in the focus direction and in the track direction. In FIG. 7, the servo controller for access 15-2 and the controller 15-1 are integrated into the main controller 15.

In the recording information detection system, on the other hand, the polarization characteristics of the reflected laser light, which change depending on the magnetization direction of the magneto-optical recording on the optical information medium 4, are converted into light intensity. In other words, in the three-beam Wollaston prism 26, the input beam is separated into two beams where the polarization directions are perpendicular to each other by polarization detection, the two beams enter the two-division photo-detector 20 through the cylindrical face lens 21, and are photo-electric converted respectively.

The two electric signals G and H, after the photo-electric conversion by the two-division photo-detector 20, are added by the addition amplifier 29 according to the arithmetic expression in FIG. 9, and become the first ROM signal (ROM 1=G+H), and at the same time are subtracted by the subtraction amplifier 30, and become the RAM read (MO) signal (RAM=G−H), and both are input to the main controller 15 respectively.

In FIG. 7, the reflected lights of the semiconductor laser diode LD, which entered the photo-detector for APC 13, are photo-electric converted and enter the main controller 15 as the second ROM signal (ROM 2) via the amplifier 14.

Also as described above, the first ROM signal (ROM 1), which is the output of the addition amplifier 29, the RAM signal (RAM), which is the output of the differential amplifier 30, the focus error signal (FES) from the FES generation circuit 23, and the track error signal (TES) from the TES generation circuit 24, are input to the main controller 15.

Also the recording data and the reading data are input/output to the main controller 15 via the interface circuit 33 with the data source 32.

The first ROM signal (ROM 1=G+H), the second ROM signal (ROM 2=I) and the RAM signal (RAM=G−H) to be input to the main controller 15 are detected and used according to each mode, that is, ROM and RAM simultaneous regeneration, ROM regeneration and magnetic field modulation and light modulation RAM recording (WRITE).

FIG. 10 is a table showing the combination of ROM 1 (=G+H), ROM 2 (=I) and RAM (G−H) in each mode. The main controller 15 generates a command signal for the LD driver 31 according to each mode. According to the command signal, the LD driver 31 performs negative-feedback control of the emission power of the semiconductor laser diode LD based on the first ROM signal (ROM 1=G+H) and the second ROM signal (ROM 2=I) at ROM and RAM regeneration, and performs negative-feedback control of the emission power of the semiconductor laser diode LD based on the second ROM signal (ROM 2=I) at ROM regeneration and RAM recording.

At magneto-optical (RAM) recording, data from the data source 32 is input to the main controller 15 via the interface 33 (see FIG. 7). When the magnetic field modulation recording system is used, and the main controller 15 supplies this input data to the magnetic head driver 34. The magnetic head driver 34 drives the magnetic head 35 and modulates the magnetic field according to the recorded data. At this time in the main controller 15, a signal to indicate recording is sent to the LD driver 31, and the LD driver 31 performs negative-feedback control for the emission of the semiconductor laser diode LD so as to be the optimum laser power for recording according to the second ROM signal (ROM 2=I).

When the light modulation recording system is used, this input data is sent to the LD driver 31 and drives the laser diode LD for light modulation. At this time in the main controller 15, a signal to indicate recording is sent to the LD driver 31, and the LD driver 31 performs negative-feedback control for the emission of the semiconductor laser diode LD so as to be the optimum laser power for recording according to the second ROM signal (ROM 2=I).

In the above example, the focusing error signal is detected by the astigmatism method, the tracking error signal is detected by the three-beam method, and the MO signal is detected by the differential detection signal of the polarization component, but the above mentioned optical system is used only for the present embodiment, and the knife edge method and the spot size position detection method, for example, can be used for the focusing error detection method without problems. For the tracking error detection method, such a method as the push-pull method and the phase difference method can be used without problems.

The main controller 15 (servo controller 15-2 in the case of FIG. 5) drives the focus actuator 19 according to the detected focus error signal FES to perform the focusing control of the optical beam. The main controller 15 (servo controller 15-2 in the case of FIG. 5) also drives the track actuator 6 according to the detected track error signal TES to performs seek and track follow-up control of the optical beam.

In this case, the signals G+H of the detector 25 or I of the detector 13 is used for laser power adjustment. When a ROM signal and a RAM signal are simultaneously regenerated, as shown in FIG. 10, then laser power is controlled for the signal G+H to be constant, so that the RAM read signal (=G−H) does not receive cross-talk from the phase pit signals of the optical information recording medium 4. ROM is not detected during light modulation recording.

LD Driver

The LD driver, where the negative-feedback mechanism is installed in the above mentioned basic ROM-RAM simultaneous read mechanism, will be described.

Figure 11:
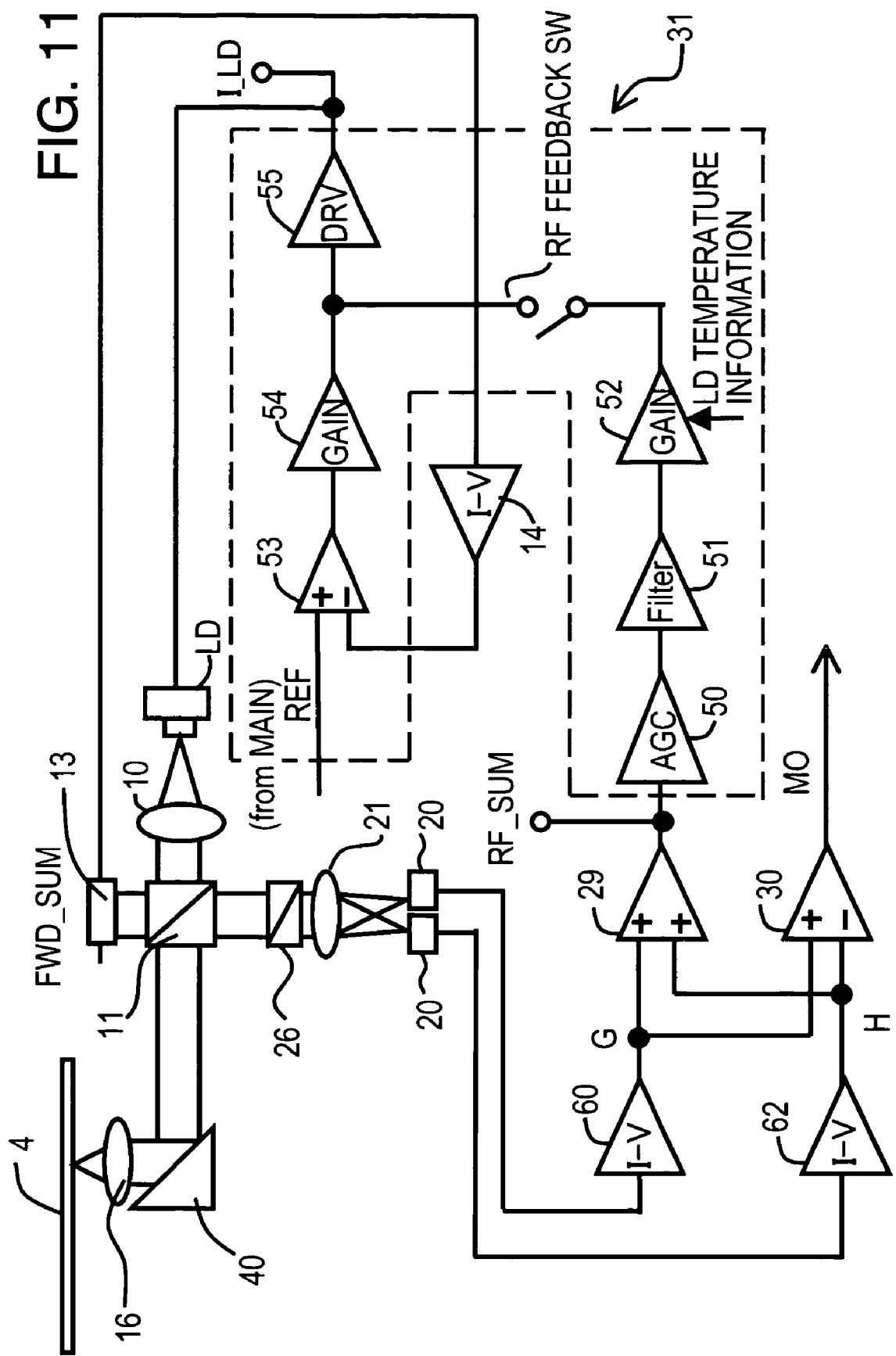
FIG. 11 is a block diagram depicting the LD driver in FIG. 5 and FIG. 7.

FIG. 11 is a detailed block diagram of the LD driver in FIG. 5 and FIG. 7. In FIG. 11, composing elements the same as those in FIG. 5 and FIG. 7 are denoted with the same reference numerals. In FIG. 11, the optical system is an optical system with NA=0.55, t=1.20 mm and λ=785 nm. The reflected lights from the disk 4 enter the detector 20 via the three-beam Wollaston Prism 26 and the condensing lens 21, and are converted into the voltage signals G and H by the I-V (current-voltage) conversion circuits 60 and 62.

The addition amplifier 29 determines the sum of the voltage signal G and H to acquire RFSUM signals (first ROM signals). The subtraction amplifier 30 determines the difference between the voltage signals G and H to acquire MO signals (RAM signals).

As a method for driving the laser, the APC (Auto Power Control) mechanism, which is generally used, will be described. The output of the APC detector 13, which is monitoring the emitting light, is converted into detection voltage by the I-V (current-voltage) conversion circuit 14, then is compared with the reference voltage REF which is output from the main controller 15, and drives the laser diode LD via the gain amplifier 54 and the driver circuit 55 using the difference. By this, a predetermined emission amount is always acquired from the laser diode LD.

On the other hand, to perform RF (phase pit suppression) feedback, in the LD driver 31, an RFSUM signal is sent to be a predetermined amplitude by the AGC amplifier 50, and is input to the driver circuit 55 of the APC by the RF feedback switch SW via the filter 51 and the gain adjustment circuit 52. When the RF feedback switch SW is ON based on the control of the main controller 15, the RFSUM signal is added with the APC computing output (difference) and is input to the driver circuit 55 to drive the laser diode LD. This gain adjustment circuit 52 is constructed to be a variable gain depending on the laser diode temperature information, as described later.

As FIG. 12 shows, when the RF feedback is OFF, the LD drive circuit is controlled to be constant by the APC. The MO signals (G−H), on the other hand, are modulated by the phase pit signal RFSUM (G+H), where phase pit cross-talk is generated. When the RF feedback is turned ON, as shown in FIG. 13, the output of the RFSUM signal according to the phase pit is added to the APC drive current, then the LD drive current changes at the reverse phase of the RFSUM signal, and a phase pit signal no longer appears on the MO signal, therefore phase pit cross-talk can be decreased.

Figure 14:
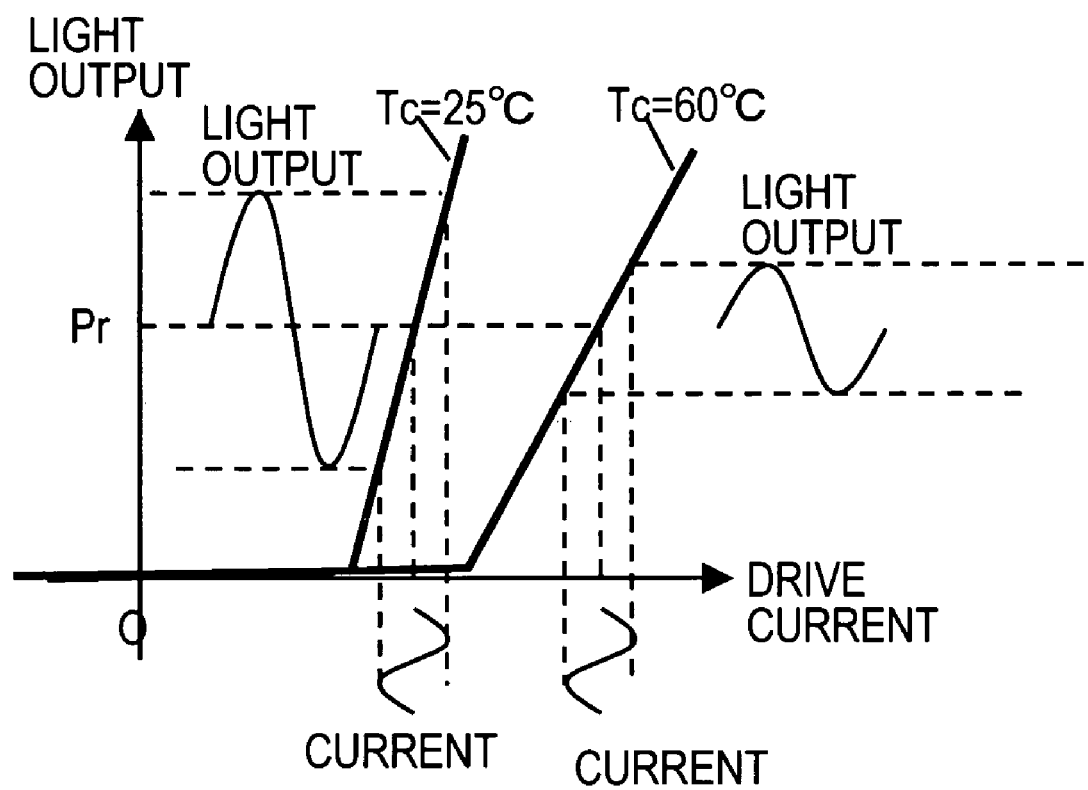
FIG. 14 is a diagram depicting the relationship of the optical output with respect to the drive current of the semiconductor laser.

As FIG. 14 shows, in the emission characteristics of the semiconductor laser LD, the optical output of the semiconductor laser LD changes depending on the temperature Tc. For example, even if the drive current value is the same, optical output is high at the temperature Tc=25° C., and is low at the temperature Tc=60° C. The temperature of the semiconductor laser LD changes by supplying the drive current into the semiconductor laser.

Therefore when the gain of the RF feedback is fixed, the optical output changes, as shown by the dotted line in FIG. 13, if the temperature is low, and as shown by the solid line in FIG. 13, if the temperature is high. Therefore the phase pit cross-talk reduction effect by the RF feedback changes depending on the temperature of the laser element. So even if RF feedback is performed, the characteristics of the MO signal deteriorates. For example, in the case of FIG. 13, the MO signal is influenced by the phase pit signal if the temperature is low, as shown by the dotted line, which is close to the case of the RF feedback OFF in FIG. 12. This example is the case when the RF feedback gain is fixed using the case of a high temperature as a reference.

Figure 15:
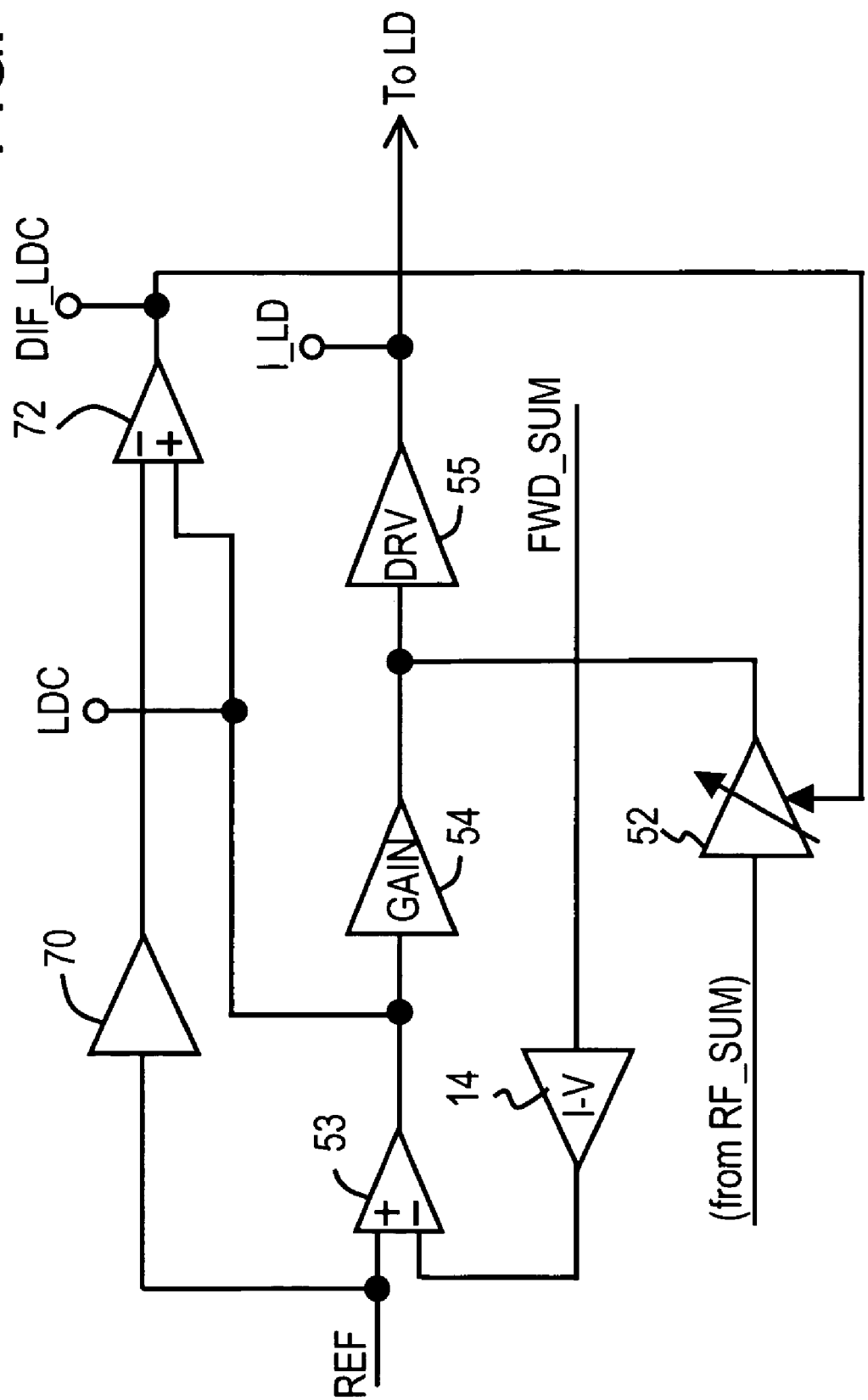
FIG. 15 is a block diagram depicting the temperature control circuit in FIG. 11 according to the first embodiment.

FIG. 15 is a block diagram depicting the first embodiment of the laser temperature detection circuit in FIG. 11, and composing elements the same as those in FIG. 11 are denoted with the same reference numerals. As the means for detecting the laser temperature, the laser drive current and the reference voltage are compared. The temperature detection circuit is comprised of the amplifier for granting a predetermined gain and offset to the reference voltage REF, and a subtraction amplifier 72 for subtracting the output of the amplifier 70 from the APC differential signal LDC of the comparator 53.

Even if the laser temperature changes, the detection signals FWD_SUM still become a constant current by APC, but the potential of the APC differential signal LDC changes depending on the laser temperature. By adjusting so as to be LDC=A*REF+B at the reference temperature and by subtracting the reference voltage REF from the APC differential signal LDC by the subtraction amplifier 72, the output DIFLDC, where the temperature rises in the positive as the laser drive current increases and the temperature drops in the negative as the laser drive current decreases, can be acquired.

By this DIFLDC, the gain of the gain amplifier 52 is controlled. In other words, according to DIFLDC, the gain of the source signal RFSUM of the RF feedback is made variable. In the case of the examples in FIG. 13 and FIG. 14, gain is controlled to be low if the temperature is low, and gain is controlled to be high if the temperature is high, by the output DIFLDC.

By this, RF feedback gain, with which the quality of MO signals does not deteriorate depending on the change of the laser temperature, can be set. Therefore the characteristics of an MO regeneration signal can be further improved.

Figure 16:
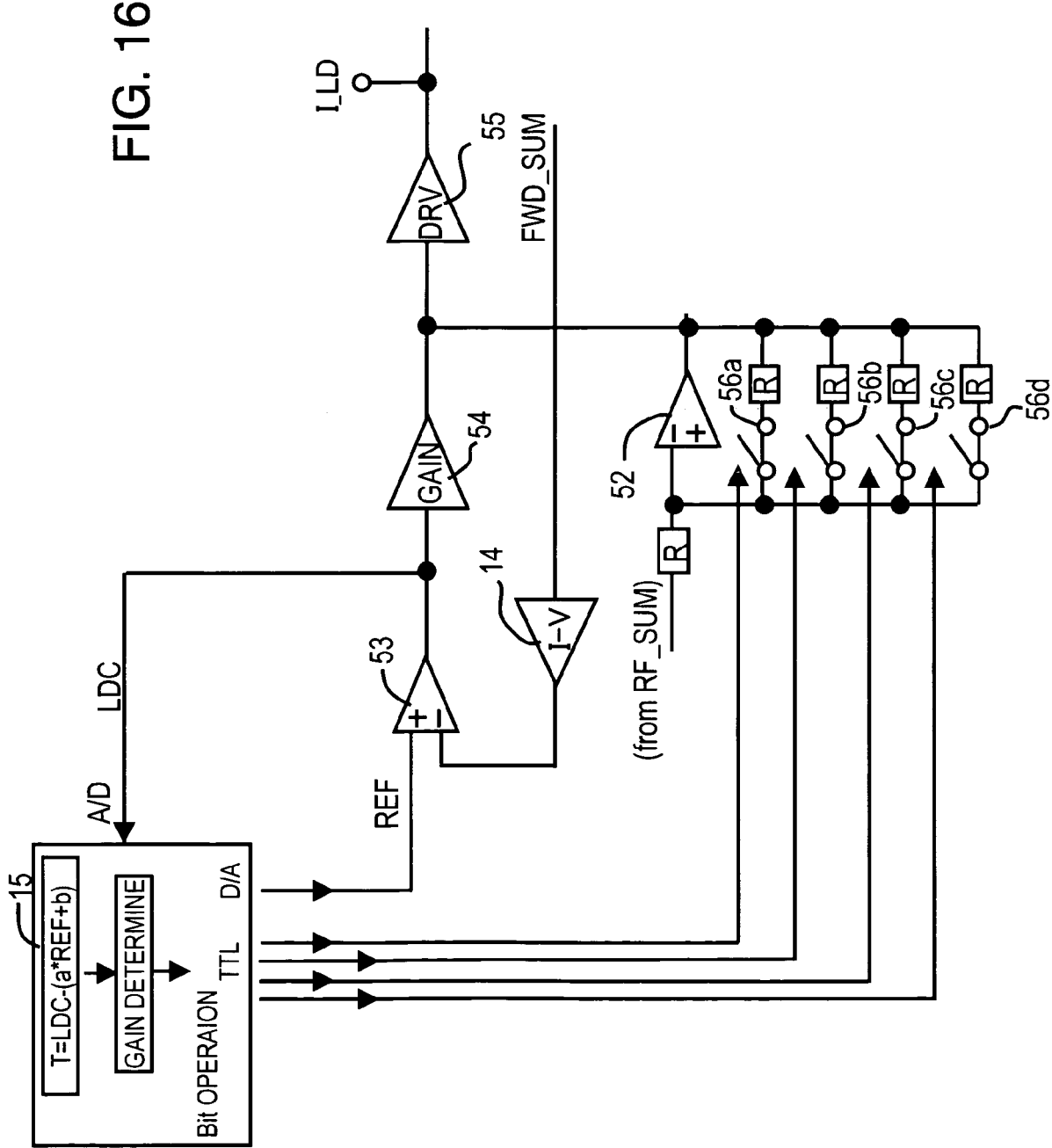
FIG. 16 is a block diagram depicting the temperature control circuit in FIG. 11 according to the second embodiment.

FIG. 16 is a block diagram depicting the second embodiment of the laser temperature detection circuit in FIG. 11, and composing elements the same as those in FIG. 11 are denoted with the same reference numerals. In this example as well, the laser drive current and the reference voltage are compared as a means for detecting the laser temperature. The temperature detection circuit is implemented by a program of the main controller 15. This program performs digital conversion on the APC differential signal LDC of the comparator 53, subtracts (a*REF+b) from the LDC, and determines the gain. The gain amplifier 52 has a plurality of (example, 4) sets of resistors for adjusting the feedback resistance of the amplifier and the switches 56a to 56d so that digital operation in the main controller 15 becomes easier.

In this example as well, even if the laser temperature changes, the detection signals FWD_SUM still become a constant current by APC, but the potential of the APC differential signal LDC changes depending on the laser temperature. By adjusting so as to be LDC=A*REF+B at the reference temperature and subtracting (a*reference voltage REF+b) from the APC differential signal LDC by the main controller 15, the output DIFLDC, where the temperature rises in the positive as the laser drive current increases and the temperature drops in the negative as the laser drive current decreases, can be acquired.

By this DIFLD, the gain of the gain amplifier 52 is determined and the switches of the feedback resistors 56a to 56d of the gain amplifier 52 are controlled. In other words, according to DIF_LDC, the gain of the source signal RFSUM of the RF feedback is made variable. In the case of the examples in FIG. 13 and FIG. 14, gain is controlled to be low if the temperature is low, and gain is controlled to be high if the temperature is high, by the output DIFLDC.

By this, RF feedback gain, with which the quality of the MO signals does not deteriorate depending on the change of the temperature, can be set. Therefore the characteristics of an MO regeneration signal can be further improved. In this example, in the microcomputer of the main controller 15, the laser drive current control voltage LDC is connected to the A/D channel, and is sampled at a predetermined time interval, and the difference between the laser drive current control voltage LDC and the reference voltage REF is computed, and gain is determined according to the result, and the gain of the RF feedback is made variable by the ON/OFF of the switch of the feedback resistor.

Figure 17:
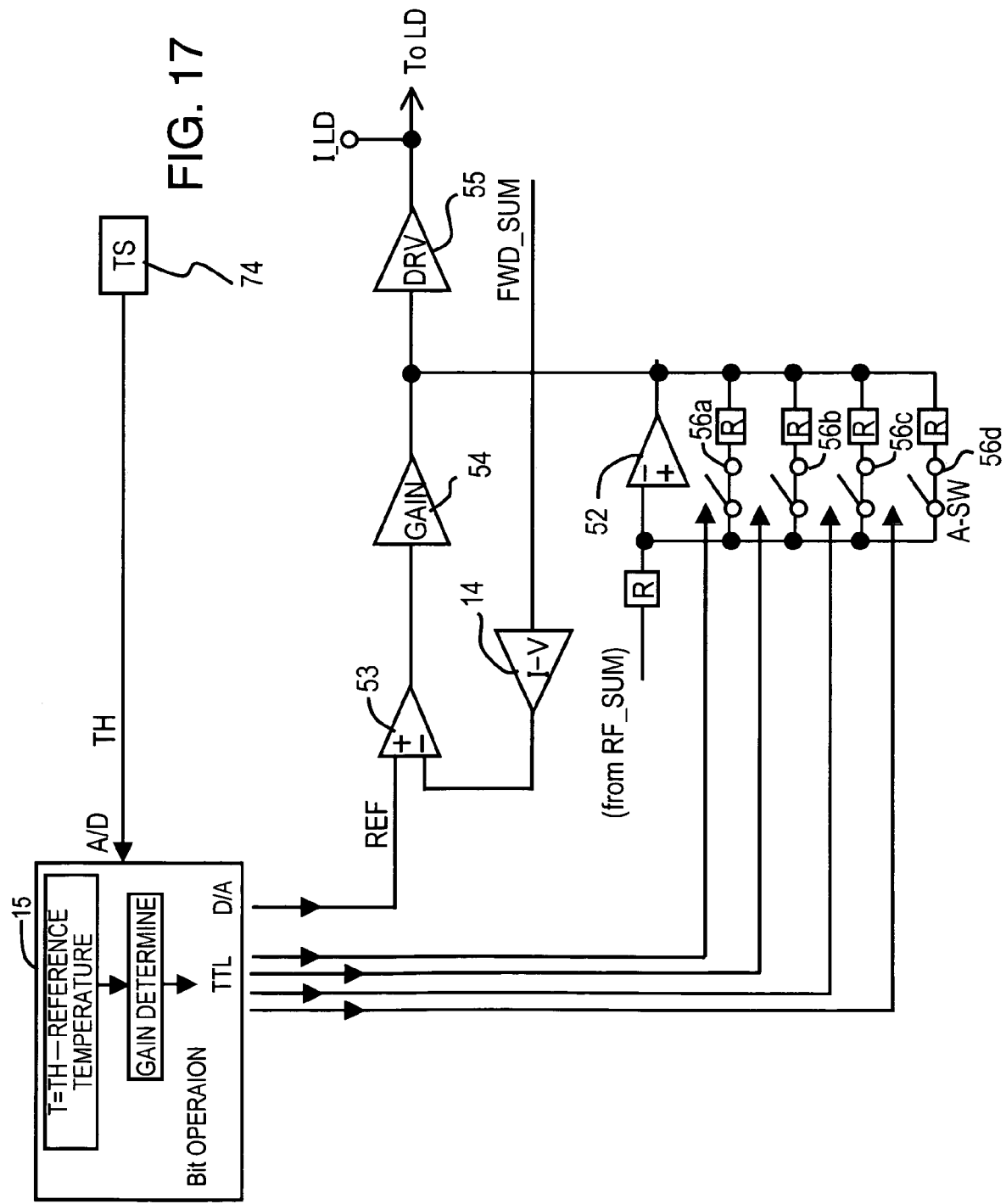
FIG. 17 is a block diagram depicting the temperature control circuit in FIG. 11 according to the third embodiment.

FIG. 17 is a block diagram depicting the third embodiment of the laser temperature detection circuit in FIG. 11, and composing elements the same as those in FIG. 11 are denoted with the same reference numerals. As a means for detecting the laser temperature, a temperature sensor 74 is installed on a radiating plate on which the laser diode LD is mounted.

A program of the main controller 15 performs digital conversion on the detected temperature TH of the temperature sensor 74, subtracts the reference temperature from TH, and determines the gain. The gain amplifier 52 has a plurality of (example, 4) sets of resistors for adjusting the feedback resistance of the amplifier and the switches 56a to 56d so that digital operation in the main controller 15 becomes easier.

The main controller 15 subtracts the reference temperature from the detected temperature TH, therefore the output T, where the temperature rises when it is positive, and the temperature drops when it is negative, can be acquired.

By T, the gain of the gain amplifier 52 is determined and the switches of the feedback resistors 56a to 56d of the gain amplifier 52 are controlled. In other words, according to the temperature difference, the gain of the source signal RFSUM of the RF feedback can be made variable. In the case of the examples in FIG. 13 and FIG. 14, gain is controlled to be low if the temperature is low, and gain is controlled to be high if the temperature is high.

By this, RF feedback gain, with which the quality of MO signals does not deteriorate depending on the change of the laser temperature, can be set. Therefore the characteristics of MO regeneration signals can be further improved.

Other Embodiments

The present invention was described above using embodiments, but the present invention can be modified in various ways within the scope of the essential character of the present invention, and these shall not be excluded from the technical scope of the present invention. For example, the size of the phase pits is not limited to the above numeric values, but can be other values. Also for the magneto-optical recording film, other magneto-optical recording material can be used. Also the magneto-optical recording medium is not limited to a disk type, but may be a card type and other shapes. Also the present invention can be applied to the regeneration of RAM only.

INDUSTRIAL APPLICABILITY

In the optical storage medium which can simultaneously regenerate ROM and RAM having phase pits and a recording layer, a feedback gain of the phase pit modulation signal is changed depending on the change of the laser temperature, so the RF feedback gain, with which the MO signals do not deteriorate by the change of the laser temperature, can be set. Therefore the characteristics of the MO regeneration signals by the feedback of the phase pit modulation signals can be improved.

The invention claimed is:

1. An optical storage device, comprising:
   an optical head for irradiating lights from a laser element onto a ROM-RAM optical recording medium where a recording film is formed on a substrate in which phase pits are formed, and detecting return lights from said optical recording medium;
   a signal detection unit for detecting light intensity modulated by said phase pits as ROM signals from said return lights, and detecting RAM signals where said return lights were modulated by said recording film;
   a reduction unit for reducing the cross-talk of said phase pits of the RAM signals of said recording film by feeding back said ROM signals to laser drive current of said laser element; and
   an adjustment unit for adjusting said reduction unit so as to present a constant cross-talk suppression effect regardless of temperature change of said laser element,
   wherein the optical storage device further comprises:
   a second signal detection unit for detecting an intensity of the irradiated light from said laser element to obtain a second ROM signal; and
   a temperature detection means for detecting a temperature of said laser element,
   said adjustment unit further comprising means for changing a gain of said feedback ROM signal from said phase pits according to detected temperature of said temperature detection unit when reproducing ROM and RAM,
   wherein said second ROM signal is used as a reproduced ROM signal when reproducing ROM and RAM.

2. The optical storage device according to claim 1, wherein said adjustment unit further comprises means for comparing APC reference voltage to be applied and drive voltage to perform APC control of said laser element, and changing the feedback gain.

3. The optical storage device according to claim 2, wherein said adjustment unit further comprises means for performing A/D conversion of the drive voltage of the APC control of said laser element and inputting the A/D converted drive voltage into a main controller, and having the main controller compute the difference between the reference voltage and the drive voltage, and changing the feedback gain.

4. The optical storage device according to claim 1, wherein said adjustment unit further comprises:
   a temperature sensor for detecting the temperature of said laser element; and
   means for computing the difference between the detected temperature and the drive voltage, and changing the feedback gain.

5. The optical storage device according to claim 1, wherein the recording film of said ROM-RAM optical storage medium is composed of a magneto-optical recording layer,
   and wherein said signal detection unit detects differential amplitude of the polarization component of said return lights as RAM signals.

6. The optical storage device according to claim 1, further comprising an APC control circuit for detecting the emitting light of said laser element and controlling the optical output of said laser element to be constant,
   and wherein said laser element is driven by adding the output of said reduction unit to the output of said APC control circuit.

7. The optical storage device according to claim 6, further comprising a feedback control switch for controlling whether the output of said reduction unit is applied to said APC control circuit.

8. A reading method for an optical storage medium, comprising steps of:
   irradiating lights from a laser element onto a ROM-RAM optical recording medium where a recording film is formed on a substrate in which phase pits are formed, and detecting return lights from said optical recording medium, by an optical head;
   detecting the light intensity modulated by said phase pits as ROM signals from said return light, and detecting the RAM signals where said returns lights were modulated by said recording film;
   reducing the cross-talk of said phase pits of the RAM signals of said recording film by feeding back said ROM signals to the laser drive current of said laser element;
   adjusting said feed back so as to present a constant cross-talk suppression effect regardless of the temperature change of said laser element,
   detecting an intensity of the irradiated light from said laser element to obtain a second ROM signal;
   detecting a temperature of said laser element, and
   changing a gain of said feedback ROM signal from said phase pits according to detected temperature of said temperature detection unit when reproducing ROM and RAM,
   wherein said second ROM signal is used as a reproduced ROM signal when reproducing ROM and RAM.

9. The reading method for an optical storage medium according to claim 8, wherein said adjusting step comprises a step of comparing APC reference voltage to be applied and drive voltage to perform APC control of said laser element, and changing the feedback gain.

10. The reading method for an optical storage medium according to claim 9, wherein said adjusting step further comprises a step of performing A/D conversion of the drive voltage of the APC control of said laser element and inputting it into a main controller, and having the main controller compute the difference between the reference voltage and the drive voltage, and changing the feedback gain.

11. The reading method for an optical storage medium according to claim 9, wherein said adjusting step further comprises a step of computing the difference between the detected temperature by a temperature sensor for detecting the temperature of said laser element and the drive voltage, and changing the feedback gain.

12. The reading method for an optical storage medium according to claim 9, wherein the recording film of said ROM-RAM optical storage medium is composed of a magneto-optical recording layer,
   and wherein said signal detection step detects the differential amplitude of the polarization component of said return lights as RAM signals.

13. The reading method for an optical storage medium according to claim 8, further comprising a step of driving said laser element by additional result the detecting the emitting light of said laser element, adding the output of said reducing step to the output of APC control for detecting the emitting light of said laser element and controlling the optical output of said laser element to be constant.

14. The reading method for an optical storage medium according to claim 13, further comprising a feedback control switch for controlling whether the output of said reducing step is applied to said APC control.

* * * * *

UNITED STATES PATENT AND TRADEMARK OFFICE
CERTIFICATE OF CORRECTION

PATENT NO.         : 7,283,445 B2                                          Page 1 of 1
APPLICATION NO.    : 11/047062
DATED              : October 16, 2007
INVENTOR(S)        : Satoshi Yamashita It is certified that error appears in the above-identified patent and that said Letters Patent is hereby corrected as shown below:

Col. 12, line 55, delete "9" and insert --8--.

Col. 12, line 62, delete "9" and insert --8--.

Signed and Sealed this

Tenth Day of June, 2008

JON W. DUDAS
*Director of the United States Patent and Trademark Office*